United States Patent [19]

Manica et al.

[11] Patent Number: 5,057,561

[45] Date of Patent: Oct. 15, 1991

[54] HOT MELT ADHESIVE COMPOSITIONS BASED ON POLYESTERS

[76] Inventors: Michele Manica, 22, via A. Ducco; Antonio Chiolle, 156, via Darsena; Gian Paolo Maltoni, 80, via Garibaldi all of, 44100 Ferrara, Italy

[21] Appl. No.: 383,253

[22] Filed: Jul. 21, 1989

Related U.S. Application Data

[63] Continuation of Ser. No. 099,737, Sep. 22, 1987, abandoned.

[30] Foreign Application Priority Data

Sep. 25, 1986 [IT] Italy .................. 21807 A/86

[51] Int. Cl.$^5$ .............................................. C08L 95/00
[52] U.S. Cl. ........................................ 524/68; 525/444; 525/173; 525/92; 525/174
[58] Field of Search .............. 525/444, 442, 437, 173, 525/92, 174; 524/68

[56] References Cited

U.S. PATENT DOCUMENTS

| 3,329,740 | 7/1967 | Battersby | 525/437 |
| 3,699,187 | 10/1972 | Gardziella | 524/497 |
| 3,832,314 | 8/1974 | Hoh et al. | 525/442 |
| 3,941,904 | 3/1976 | Hoh et al. | 525/442 |
| 3,944,516 | 3/1976 | Petke . | |
| 3,959,062 | 5/1976 | Hoh et al. | 525/442 |
| 4,070,417 | 1/1978 | Isaka et al. | 525/444 |
| 4,247,427 | 1/1981 | Edinger | 525/173 |
| 4,315,882 | 2/1982 | Hiratsuka et al. | 525/444 |
| 4,321,341 | 3/1982 | Neubey et al. | 525/444 |
| 4,576,997 | 3/1986 | Trotter et al. | 525/444 |

FOREIGN PATENT DOCUMENTS

| 2163670 | 7/1972 | Fed. Rep. of Germany . | |
| 2426075 | 1/1980 | France | 525/444 |
| 226079 | 12/1984 | Japan | 525/444 |
| 61-43676 | 3/1986 | Japan . | |
| 2144 | 6/1984 | PCT Int'l Appl. | 525/444 |
| 620001 | 10/1980 | Switzerland . | |

OTHER PUBLICATIONS

Patent Abstracts of Japan, vol. 10, No. 203 (c-360) [2259], Jul 16, 1986.

*Primary Examiner*—Paul R. Michl
*Assistant Examiner*—Christopher P. Rogers

[57] ABSTRACT

Hot melt adhesive compositions comprising:
(a) 40%-90% by weight of a copolyester having a melting temperature lower than 150° C., obtained from an aromatic dicarboxylic acid, an aliphatic dicarboxylic acid, and a glycol;
(b) 5%-55% by weight of an elastomer based on a thermoplastic segmented copolyester having a melting temperature of at least 100° C., and containing recurring units deriving from polyetherglycol; and
(c) 5%-55% by weight of a natural or synthetic thermoplastic resin having a Brookfield viscosity, at 180° C., lower than 25,000 cps.

16 Claims, No Drawings

HOT MELT ADHESIVE COMPOSITIONS BASED ON POLYESTERS

This application is a continuation of application Ser. No. 099,737, filed Sept. 22, 1987, now abandoned.

FIELD OF THE INVENTION

The present invention relates to hot melt adhesive compositions based on polyesters.

Particularly, the present invention relates to hot melt adhesive compositions based on copolyesters providing particularly desirable adhesive properties which make them especially suitable for certain specific applications. Hot melt adhesives, generally known as "hot melt" adhesives, are generally used for bonding a variety of material such as wood, metals, fabrics, leather, imitation leather, paper, etc.

These thermoplastic adhesives are applied in the melt state, without any solvent, and, after cooling, they form a bond between the materials to be adhered.

BACKGROUND OF THE INVENTION

It is known to use polyamides, polymers based on ethylene; vinyl acetate, acrylates and the like, as hot melt adhesives.

Hot melt adhesives based on polyesters obtained by polycondensation of terephthalic and/or isophthalic acid and a dicarboxylic aliphatic acid containing from 2 to 10 carbon atoms, with glycols containing from 2 to 10 carbon atoms in the chain, are also known.

For improving the adhesive properties and/or fluidity of these hot melt adhesives, it is also known (for example from U.S. Pat. Nos. 3,329,740 and 3,699,187) to mix these polyesters and/or copolyesters with natural or synthetic polymeric materials having a low molecular weight, such as epoxy resin or phenolic resin, or to mix two copolyesters having different contents of aliphatic dicarboxylic acids.

However, these adhesive compositions present certain drawbacks that limit the universality of their fields of application. For example, these compositions have an unsatisfactory resistance to thermo-oxidation and to hydrolysis, excessive stiffness at room temperature or at low temperatures, inadequate adhesion to some substrates, and lack inside cohesion.

These drawbacks can impose some limitations in the exploitation of these adhesive compositions in some sectors, such as that of book bindery, bonding of wood panels, assembling in the footwear or electronics industry, etc.

It has now been discovered that the above-mentioned drawbacks are substantially eliminated by adding to the adhesive compositions, constituted by a copolyester of the above-mentioned type and by a fluidizing agent based on a natural or synthetic polymeric substance having low molecular weight, a block copolyester containing polymerized polyetherglycol units.

DETAILED DESCRIPTION OF THE INVENTION

The present invention resides therefore in an adhesive composition comprising:
(a) from 40 to 90% by weight of a copolyester having a melting temperature higher than 50° C. and obtained by polycondensation of an aromatic dicarboxylic acid, an aliphatic dicarboxylic acid containing from 4 to 12 carbon atoms, and a glycol containing from 2 to 20 carbon atoms;
(b) from 5 to 55% by weight of an elastomer based on a thermoplastic block copolyester, having a melting point of at least 100° C. and consisting of a plurality of recurring short chain ester units and recurring long chain ester units linked together by ester linkages, said short chain units amounting to 10 to 75% by weight of the copolyester and having the formula:

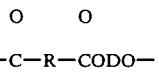

and said long chain units amounting to 90 to 25% by weight of the copolyester and having formula:

wherein R is a divalent aromatic or cycloaliphatic radical containing from 6 to 20 carbon atoms, D is a divalent radical remaining after removal of the hydroxyl groups from an organic diol having a molecular weight of less than 250, and G is a divalent radical remaining after removal of the hydroxyl groups from a polyetherglycol having a molecular weight between 300 and 8,000;
(c) from 5 to 55% by weight of a thermoplastic resin of low molecular weight, having a Brookfield viscosity, at 180° C., less than 25,000 centipoises; and the sum of (a)+(b)+(c) being 100.

The copolyesters (a) used in the adhesive compositions of the present invention have a melting temperature preferably between 100° and 150° C., a glass transition temperature (Tg) between −40° and +30° C., and a Brookfield viscosity, at 180° C., higher than 1,500 centipoises. These copolyesters are obtained according to well known polycondensation or poly-trans-esterification reactions of a dicarboxylic aromatic acid and a dicarboxylic aliphatic acid, optionally in the form of alkyl-esters, with a glycol.

The dicarboxylic aromatic acid generally has a molecular weight less than 350. Representative examples of aromatic dicarboxylic acids are: terephthalic acid, isophthalic acid, phthalic acid, dibenzoic acid, etc. Terephthalic acid is preferred and, if desired, it may be employed with up to 50% by moles of isophthalic acid.

The dicarboxylic aliphatic acid preferably contains from 6 to 12 carbon atoms. Examples of dicarboxylic aliphatic acids which may be used are: adipic acid, pimelic acid, suberic acid, azelaic acid, sebacic acid, nonanedicarboxylic acid etc. The amount of aliphatic acid in the copolyester is preferably between 5 and 35% by moles of the acid component.

The glycols used in the preparation of the copolyester of the present adhesive compositions have the formula:

wherein $R_1$ is a linear or branched alkylene radical containing from 2 to 20 carbon atoms or a cycloalkylene radical containing from 6 to 20 carbon atoms.

Examples of glycols having formula (III) are: ethylene glycol; propylene glycol; 2,2-dimethyl-1,3-propanediol; 2,2-diethyl-1,3-propane-diol; 2,2-diphenyl-1,3-propane-diol; 2,2-dimethoxy-1,3-propane-diol; 1,2-, 1,3-, and 1,4-butane-diol; 2,3-butane-diol; 3,3-dimethyl-1,5-pentane-diol; 1,6-hexane-diol; 1,7-heptane-diol; cyclohexanediol; cyclohexanedimethanol, etc., as well as mixtures of these glycols.

The aliphatic glycols containing from 2 to 8 carbon atoms are particularly preferred.

The elastomers based on block (segmented) copolyesters, used in the adhesive composition of the present invention, have a melting point preferably between 140° and 220° C. and a glass transition temperature (Tg) between −60° and 0° C.

The block copolyesters (b) are obtained by copolymerizing, by well known polycondensation or polytransesterification techniques:

a dicarboxylic acid of formula

$$HOOC-R-COOH \qquad (IV)$$

wherein R is an aromatic or cycloaliphatic radical having from 6 to 20 carbon atoms;

a glycol of formula $$HO-D-OH$$

wherein D is a linear or branched alkylene radical containing from 2 to 20 carbon atoms or a cycloalkylene radical containing from 6 to 20 carbon atoms, and a polyether-glycol of formula

$$HO-G-OH \qquad (IV)$$

wherein G is a polyether radical of formula:

$$-(R_2-O)_n-$$

wherein $R_2$ is a linear or branched alkylene radical containing from 2 to 20 carbon atoms and n is an integer higher than 2.

The polyether-glycols of formula IV have a molecular weight between 300 and 8,000, and preferably between 500 and 4,000. Preferably, these polyether-glycols have melting points less than 55° C. and a carbon-to-oxygen atomic ratio greater than 2.5.

The acid dicarboxylic term, as used in the present description and in the claims, is understood to include also dicarboxylic acid equivalents, such as esters or ester-forming derivatives such as acid chlorides and anhydrides or other derivatives behaving substantially like dicarboxylic acids in the polymerization with glycols.

The preferred block elastomeric copolyesters are those in which the dicarboxylic acid is aromatic and contains from 8 to 16 carbon atoms, the glycol is aliphatic and contains from 2 to 8 carbon atoms, and the polyetherglycol is a poly(alkylene-ether) glycol wherein the alkylene group contains from 2 to 8 carbon atoms.

The elastomeric copolyesters prepared from terephthalic acid or a mixture of terephthalic acid and isophthalic acid, from 1,4-butane-diol and poly-tetramethylene-ether-glycol, having a molecular weight between 500 and 4,000, are particularly preferred in the adhesive compositions of the present invention.

In addition to the components (a) and (b), the adhesive compositions of the present invention contain also one or more thermoplastic resins of low molecular weight, which form with said components (a) and (b) compatible mixtures and which have a Brookfield viscosity, at 180° C., less than 25,000 centipoises.

The term "thermoplastic resins", as used in the present description and in the claims, is understood to include hot-melt resins, both natural and synthetic, as well as wax materials. Suitable thermoplastic resins of low molecular weight include:

the phenolic resins resulting from the reaction of phenols or phenolic compounds such as cresol, xylenol, etc., with aldehydes such as formaldehyde, acetaldehyde, etc. These resins are fully described in the Kirk-Othmer "Encyclopedia of Chemical Technology", Second Edition, 1966, Interscience Publishers, Vol. 15, pages 176–207.

the colophonic resins and the modified colophonic resins such as the resins known with the Trade Mark ROKRASIN;

the coumarone-indene resins, namely the hydrocarbon resins obtained by polymerization of resin-formers recovered from coke-oven gas and in the distillation of coal tar; these resins are fully described in the Kirk-Othmer Encyclopedia, supra, Volume 11, pages 243–247;

the petroleum resins, fully described in the Kirk-Othmer Encyclopedia, supra, Volume 11, pages 248–250;

the styrene resins consisting of low molecular weight homopolymers of styrene and/or copolymers of styrene and other comonomers such as alphamethyl-styrene, vinyl toluene, etc., and butadiene;

the terpene resins consisting of polymers of terpenes which are hydrocarbons of the formula $C_{10}H_{16}$. These resins are fully described in the Kirk-Othmer Encyclopedia, supra, Volume 11, pages 252–254;

asphalts and bitumens, such as, native asphalts and asphaltites such as Gilsonite, Grahamite, etc. These asphalts and bitumens are fully described in Abrahams, "Asphalts and Allied Substances", 6th Edition, Volume 1, Chapter 2, Van Nostrand Co., Inc., and particularly Table III on page 60;

chlorinated aliphatic hydrocarbon waxes commonly called "chlorinated waxes";

chlorinated polynuclear aromatic hydrocarbons, consisting of chlorinated aromatic hydrocarbons containing two or more aromatic rings, such as chlorinated biphenyls, chlorinated terphenyls, and the like;

olefinic polymers and copolymers such as polyethylene, atactic polypropylene, ethylenepropylene copolymers, ethylene-vinyl acetate copolymers, copolymers of ethylene and acrylic and methacrylic acids, and the like;

glycero-phthalic resins and the like.

The adhesive compositions of the present invention may contain more than one thermoplastic resin.

The preferred thermoplastic resins are the colophonic resins, the atactic polypropylene, the ethylene-vinyl acetate copolymer and the phenolic resins.

One of the outstanding advantages of the adhesive compositions of the present invention is that their constituents: copolyester, elastomer based on block copolyesters, and low molecular weight thermoplastic resin, are easy to blend together due to the relative low melt viscosity.

The adhesive compositions of the present invention may be obtained by various well-known procedures such as, for example, blending the components in the molten state, or blending in a solvent with subsequent removal of the solvent. The preferred process consists in blending the components together in finely divided form and then melting the thus-obtained blend, for example, on a hot roller mill or in an extruder. Alternatively, the components may be separately melted and then blended together in the molten form, or simultaneously fed to an extruder.

To the adhesive compositions of the present invention other additives may be added such as stabilizers, pigments, dyes, flame-retardants, lubricants, plasticizers, organic or inorganic reinforcing agents, nucleating agents, etc. The preferred nucleating agents are inorganic substances such as talc, titanium dioxide, calcium carbonate, and barium sulfate; organic substances such as sodium salts of carboxylic acid, for example sodium benzoate or sodium p.hydroxy-benzoate, sodium salts of the oleic acid dimer, or salts of low molecular weight polyester oligomers. These nucleating agents are added in an amount between 0.1 and 3% by weight with respect to the adhesive composition.

Suitable stabilizers that may be used are phenols, phosphites, hindered amines, etc., and these are added in an amount between 0.05 and 3% by weight with respect to the adhesive composition.

Substances suitable for improving hydrolysis resistance may also be added to the compositions of the present invention, such as polycarbodiimides, modified polyolefins, etc.

The compositions of the present invention show an improved performance with respect to the well known hot melt adhesives based on polyesters. They are particularly suitable for certain specific applications sectors such as:

(I) Bordering of Shaving Wood or Particle-Board Panels

For this use hot melt adhesives are required that are capable of supporting, without appreciable ungluing, continuous operating temperatures up to 75° C., as well as the presence of possible solvents used in painting operations. As compared to the known adhesives now used in this sector, the compositions of the present invention have a thermal resistance greater than 75° C. and a performance/cost ratio that is significantly better.

(II) Bookbinding

In this application sector, and particularly in that of industrial bookbinding, very high production rates are required.

The adhesives of the present invention allow one to obtain open times and setting times that are very short and lower than those of other adhesives known in this sector. Therefore, the adhesives of the present invention are particularly suitable for performing the high production rates required in the sector. Moreover, these adhesives have the significant advantage of being more easily separated from cellulosic fibers during the industrial recovery operations of the paper without forming "stickies."

(III) Vamp-Sole Adhesion In Footwear

Adhesives based on polyamides are now preferred in order to satisfy different requirements (short setting times, excellent adhesion, high flexibility). The adhesives of the present invention satisfy the same requirements, with the significant advantage of lower cost with respect to the cost of the polyamide adhesives.

The preparation as well as the properties and the performance of some adhesive compositions suitable for the above reported applications, respectively, are hereinafter described as an aid in exemplifying the invention and without any intention that the invention shall be limited thereto.

The following properties are given in the Examples:

Brookfield viscosity: measured on the molten material by a Brookfield viscosimeter at the predetermined temperature, according to the ASTM D 3236-73 and M.U. 600 methods.

Ring and Ball: represents the softening temperature of the material determined according to the ASTM E 28 and M.U. 664 methods.

Open time: represents the range of useful time elapsing between deposition of the adhesive on the substrate and the time in which such a substrate may be still coupled to a second substrate.

Setting time: represents the range of time necessary so that the two substrates, after being coupled with the adhesive, remain firmly united together.

Adhesion degree (specific adhesivity): represents the adhesion among the various paper types (standard, coated, etc.); it is evaluated at three different qualitative levels, by tearing of the two papers bonded by the adhesives, namely:

good, in the case of a complete breaking of the two sheets;

sufficient: in the case of a partial breaking of the two sheets, and poor, in the case of lack of breaking of at least one of the two sheets.

EXAMPLE 1

700 g of copolyester (a), having a Brookfield viscosity at 180° C. of about 250,000 centipoises and a melting point of about 145° C., obtained by the polycondensation of 35% by weight of dimethyl terephthalate (DMT), 42% by weight of diglycol-adipate (DGA), and 23% by weight of ethylene-glycol (MEG);

260 g of a copolyester elastomer (b) having a Brookfield viscosity at 180° C. of 220,000 centipoises and a melting point of about 155° C., obtained by the polycondensation of 31.5% by weight of dimethyl terephthalate (DMT), 15.5% by weight of butanediol (BD), 51.5% by weight of poly-oxy-tetra-methyleneglycol having a molecular weight of 1,000, and 1.5% by weight of isophthalic acid;

300 g of a phenolic resin type SP560, produced and sold by the SCHENECTADY company;

600 g of barium sulfate; and 8 g of a phenolic antioxidant, type IRGANOX 1010; were charged under nitrogen atmosphere to a blender having the capacity of 3,000 ml, equipped with an arm-stirrer and heated at 200° C.

After 1 hour, the mixture was discharged in the molten state and then pulverized by milling.

The properties and performances of the resulting adhesive were:

| | |
|---|---|
| Brookfield viscosity at 180° C. = | 220,000 centipoises; |
| Ring and Ball = | 146° C. |
| Seal temperature of the panel/ABS = border coupling | 80° C. |
| Resistance degree (peel test) = of the adhesive interposed between breakage the panel and | Good - Panel breakage over 5 kg/cm. |

-continued

| | |
|---|---|
| the ABS border. | |

The same results were obtained by using as border, besides ABS, PVC, phenolic resin and melamine resin.

EXAMPLE 2

1,400 g of copolyester of type (a), having a Brookfield viscosity at 180° C. of about 15,000 centipoises and a melting point of about 125° C., obtained by polycondensation of 35% by weight of DMT, 23% by weight of MEG, and 42% by weight of DGA;

200 g of copolyester based elastomer of type (b), having a Brookfield viscosity at 180° C. of about 200,000 centipoises and a melting point of about 155° C., obtained by polycondensation of 31.5% by weight of DMT, 1.5% by weight of isophthalic acid (IPA), 15.5% by weight of butanediol (BD) and 51.5% by weight of polyoxytetramethyleneglycol having a molecular weight of 1,000;

200 g of a second copolyester-based elastomer of type (b), having a Brookfield viscosity at 180° C. of 10,000 centipoises and a melting point of about 170° C., obtained by polycondensation from 40.6% by weight of DMT, 20% by weight of BD, 39.4% by weight of polyoxytetramethyleneglycol of molecular weight 1,000;

200 g of ROKRASIN 1887 resin (natural esterified colophonic resin produced and sold by the R. KRAEMER firm);

8 g of a phenolic antioxidant, Irganox 1010; and 4 g of a stabilizer Weston 618 were introduced, under nitrogen atmosphere into a 3,000 ml blender equipped with an arm-stirrer and heated at 180° C.

After 30 minutes, the mixture was discharged and after cooling, was broken into flakes.

The product, placed into a roller coater, was melted at 180° C. and spread on different types of paper (standard and coated) showing the following properties:

| | |
|---|---|
| Setting time | 5-6 sec. |
| Open time | 15 sec. |
| Specific adhesivity | good in all the papers |
| Resistance to repeated bendings at −10° C. | Good |
| Brookfield viscosity at 180° C. | 8,000 centipoises |
| Ring and Ball | 132° C. |

EXAMPLE 3

1,400 g of a copolyester of type (a), having a Brookfield viscosity at 180° C. of 200,000 centipoises and a melting point of about 145° C., obtained by polycondensation from 35% by weight of DMT, 42% by weight of DGA, and 23% by weight of MEG;

400 g of a copolyester-based elastomer of type (b), having a Brookfield viscosity at 180° C. of 250,000 centipoises and melting point of about 155° C., obtained by polycondensation from 31.5% by weight of DMT, 15.5% by weight of BD, 51.5% by weight of polyoxytetramethylene-glycol of molecular weight 1,000, and 1.5% of IPA;

200 g of modified phenolic resin SP560 of the SCHENECTADY firm; and 8 g of a phenolic stabilizer Irganox 1010, were introduced, under nitrogen atmosphere, into a 3000 ml blender equipped with an arm-stirrer and heated at 200° C.

After 50 minutes, the mixture was discharged and calendered into film. Test pieces were then prepared by using this adhesive film for sticking together two supports constituted respectively by:

(1) cardboard pressed and impregnated with synthetic rubber latex; and (2) hide for vamp of footware.

The setting time was 3 seconds and the resistance degree (peel-test) gave a value of 1 kg/cm, with delamination of the support of the pressed cardboard (imitation of a cork sole).

What is claimed is:

1. Hot melt adhesive compositions consisting essentially of:

(a) from 40 to 90% by weight of a copolyester having a melt temperature between 50° C. and 150° C., a glass transition temperature (Tg) between −40° C. and +30° C., and a Brookfield viscosity at 180° C. greater than 1,500 centipoises and obtained by polycondensation of an aromatic dicarboxylic acid, an aliphatic dicarboxylic acid containing from 2 to 12 carbon atoms, and a glycol having from 2 to 20 carbon atoms;

(b) from 5 to 55% by weight of an elastomer based on a thermoplastic block copolyester, having a melt temperature of at least 100° C. and consisting of a plurality of recurring short chain ester units and recurring long chain ester units linked together by ester linkages, said short chain units being present in an amount from 10 to 75% by weight of the copolyester and having of the formula:

and said long chain units being present in an amount from 90 to 25% by weight of the copolyester and having the formula:

wherein R is an aromatic or cycloaliphatic divalent radical having from 6 to 20 carbon atoms, D is a divalent radical remaining after removal of the hydroxyl groups from an organic diol having a molecular weight of less than 250, and G is a divalent radical remaining after removal of the hydroxyl groups from a polyether-glycol having a molecular weight between 300 and 8,000;

(c) from 5 to 55% of a thermoplastic resin, of low molecular weight, having a Brookfield viscosity at 180° C. less than 25,000 centipoises; and the sum of (a)+(b)+(c) being equal to 100.

2. Adhesive compositions according to claim 1, wherein the aromatic dicarboxylic acid has a molecular weight less than 350, the aliphatic dicarboxylic acid contains from 6 to 12 carbon atoms, and the glycol has the formula:

wherein $R_1$ is a linear or branched alkylene radical containing from 2 to 20 carbon atoms or a cycloalkylene radical containing from 6 to 20 carbon atoms.

3. Adhesive compositions according to claim 1, wherein the elastomer based on thermoplastic block copolyester (b) has a melting point between 140° and 220° C. and a glass transition temperature (Tg) between −60° and 0° C.

4. Adhesive compositions according to claim 3, wherein the elastomer based on thermoplastic block copolyester (b) is obtained by copolymerization of:

a dicarboxylic acid of the formula:

$$HOOC-R-COOH \qquad (IV)$$

wherein R is an aromatic or cycloaliphatic radical containing from 6 to 20 carbon atoms;
a glycol of the formula:

$$HO-D-OH \qquad (V)$$

wherein D is a linear or branched alkylene radical containing from 2 to 20 carbon atoms or a cycloalkylene radical containing from 6 to 20 carbon atoms; and
a polyetherglycol of the formula:

$$HO-G-OH \qquad (VI)$$

wherein G is a polyether radical of the formula:

$$-(R_2-O)_n-$$

wherein $R_2$ is a linear or branched alkylene radical containing from 2 to 20 carbon atom, and n is an integer greater than 2.

5. Adhesive compositions according to claim 4, wherein the polyetherglycol of formula (VI) has a molecular weight between 300 and 8,000, a melting point less than 55° C., and a ratio between carbon atoms and oxygen atoms greater than 2.5.

6. Adhesive compositions according to claim 4, wherein the polyetherglycol of formula (VI) has a molecular weight between 500 and 4,000, a melting point less than 55° C., and a ratio between carbon atoms and oxygen atoms greater than 2.5.

7. Adhesive compositions according to claim 4, wherein the elastomer based on a block copolyester is obtained from an aromatic dicarboxylic acid containing from 8 to 16 carbon atoms, an aliphatic glycol containing from 2 to 8 carbon atoms, and a poly(alkylene ether)glycol in which the alkylene group contains from 2 to 8 carbon atoms.

8. Adhesive compositions according to claim 1, wherein the low molecular weight thermoplastic resin is selected from the class consisting of phenolic resins, colophonic resins, modified colophonic resins, coumarone-indene resins, petroleum resins, styrene resins, terpene resins, asphalts, chlorinated aliphatic hydrocarbon waxes, chlorinated polynuclear aromatic hydrocarbons; olefinic polymers and copolymers, and glycerophthalic resins.

9. Adhesive compositions according to claim 1, containing in addition other additives such as stabilizers, pigments, dyes, flame retardents, lubricants, plasticizers, organic or inorganic reinforcing agents, nucleating agents, and the like.

10. Adhesive compositions according to claim 9, wherein the nucleating agents are inorganic or organic substances or salts of low molecular weight polyester oligomers; said nucleating agents being added in an amount between 0.2 and 3% by weight with respect to the adhesive composition.

11. Adhesive compositions according to claim 9, wherein the stabilizers are added in an amount between 0.5 and 3% by weight with respect to the adhesive composition.

12. Shaving wood or particle board panels comprising an adhesive composition as defined in claim 1.

13. A bookbinding comprising an adhesive composition as defined in claim 1.

14. Footwear having in the vamp-sole an adhesive composition as defined in claim 1.

15. Adhesive compositions according to claim 1, wherein the copolyester (a) is obtained by polycondensation of a dicarboxylic aromatic acid and a dicarboxylic aliphatic acid, with a glycol.

16. Adhesive compositions according to claim 1, wherein the copolyester (a) is obtained by polytransesterification of a dicarboxylic aromatic acid and a dicarboxylic aliphatic acid in the corresponding alkyl ester form, with a glycol.

* * * * *

UNITED STATES PATENT AND TRADEMARK OFFICE
CERTIFICATE OF CORRECTION

PATENT NO. : 5,057,561
DATED : October 15, 1991
INVENTOR(S) : Manica, et al

It is certified that error appears in the above-indentified patent and that said Letters Patent is hereby corrected as shown below:

Title page, insert item [73] Assignee: --AUSIMONT S.p.A., Milan, Italy--.

On the title page, above the Abstract insert Attorney, Agent, and Firm --Morgan & Finnegan--.

Signed and Sealed this

Fourteenth Day of September, 1993

Attest:

BRUCE LEHMAN

Attesting Officer

Commissioner of Patents and Trademarks